(12) United States Patent
Suber, III

(10) Patent No.: US 7,623,895 B1
(45) Date of Patent: Nov. 24, 2009

(54) FM TRANSMITTER FOR PORTABLE AUDIO DEVICE

(76) Inventor: Edward H. Suber, III, 2400 Romig Rd., Suite 135, Akron, OH (US) 44322

( * ) Notice: Subject to any disclaimer, the term of this patent is extended or adjusted under 35 U.S.C. 154(b) by 491 days.

(21) Appl. No.: 11/728,563

(22) Filed: Mar. 27, 2007

(51) Int. Cl.
*H04M 1/00* (2006.01)
(52) U.S. Cl. ............... 455/569.2; 455/569.1; 455/41.2; 455/575.1; 455/575.2; 455/575.9; 455/556.1; 455/91; 455/93; 455/99; 379/420.02; 379/420.04; 379/430; 381/77; 381/79
(58) Field of Classification Search ............... 455/41.2, 455/41.3, 569.1, 569.2, 575.1, 575.2, 575.9, 455/90.1–90.3, 91, 93, 99, 344, 345, 556.1, 455/556.2; 379/420.01–420.04, 428.01–428.02, 379/430, 432, 434; 381/23.1, 300–302, 309, 381/311, 312, 315, 77–79
See application file for complete search history.

(56) References Cited

U.S. PATENT DOCUMENTS

| | | | | |
|---|---|---|---|---|
| 6,873,862 | B2* | 3/2005 | Reshefsky | 455/569.1 |
| 7,574,180 | B2* | 8/2009 | Abe et al. | 455/102 |
| 2005/0123147 | A1* | 6/2005 | Everett et al. | 381/79 |
| 2005/0282600 | A1* | 12/2005 | Paradice, III | 455/575.9 |
| 2006/0210092 | A1* | 9/2006 | Navid | 381/74 |
| 2007/0004472 | A1* | 1/2007 | Gitzinger | 455/575.2 |
| 2007/0015537 | A1* | 1/2007 | DeBiasio et al. | 455/556.1 |
| 2007/0155440 | A1* | 7/2007 | Everett et al. | 455/569.2 |
| 2008/0089530 | A1* | 4/2008 | Bostick et al. | 381/74 |

* cited by examiner

*Primary Examiner*—Tuan A Tran

(57) ABSTRACT

The present invention relates generally to an FM transmitter and, more specifically, to an FM transmitter comprised in the headphone or the ear bud accessories to portable audio players. The instant abstract is neither intended to define the invention disclosed in this specification nor intended to limit the scope of the invention in any way.

8 Claims, 1 Drawing Sheet

FM TRANSMITTER FOR PORTABLE AUDIO DEVICE

RELATED APPLICATIONS

Not applicable.

BACKGROUND OF THE INVENTION

1. Field of the Invention

The present invention relates generally to an FM transmitter and, more specifically, to an FM transmitter comprised in the headphone or the ear bud accessories to portable audio players.

2. Description of the Related Art

Although advancements in technology have improved the capabilities of, the styles of and the popularity of portable audio players over the years, the basic purpose has remained the same, that is, to provide persons with a means to listen to music while moving. These means have included the portable transistor radio, the tape cassette player, the compact disc player and, most recently, the digital audio player. Digital audio players enable users to download audio material from an Internet site or a computer hard drive.

The material is stored on a medium in a number of formats until it is repeatedly listened to later. Digital audio players that utilize stored audio sounds (hereinafter "MP3") are extremely popular and the market is thriving for the portable versions of these devices. Similar to other portable devices, a headphone or a pair of ear buds is the means to listen to the stored music on MP3s; however, there are some disadvantages to the portable MP3. Portable MP3s cannot be utilized in automobiles because of the risks it presents to the driver's safety. The small size and the lightweight characteristics of MP3s, although most advantageous for the purposes of portability and ease, makes it difficult to engineer the device with a speaker powerful enough to broadcast the audio at a volume sufficient for a group of persons.

There is presently known a separate unit that connects to the MP3 so that it can transmit the audio to another FM receiver. A search of the prior art did not disclose any patents that read directly on the claims of the present invention; however, the following references were considered related.

U.S. Pat. No. 6,591,085 and U.S. Pub. No. 2004/0,058,649, both to Grady, teaches an FM transmitter having a means in the docking cavity to couple it to an MP3 player. U.S. Pat. No. 7,082,203 to Drakoulis et al. teaches an apparatus for coupling audio players to audio receivers. A disadvantage to these patents is that the transmitter is a separate unit to the audio player.

There is a need for a united means to transmit the audio to an FM receiver and, more specifically, to a means comprised on the MP3. This means is accomplished in the present invention, wherein an FM transmission is comprised in the headset or in the ear bud accessory that plugs into the MP3. The present invention overcomes the disadvantage of attaching a separate unit to an MP3 to transmit the audio to a receiver.

SUMMARY OF THE INVENTION

It is an object of the present invention to provide an improved means to transmit the audio stored on a portable digital player to an FM receiver. It is an object of the present invention to comprise the means on the MP3 so that a separate unit is not carried with and attached to the MP3. It is a further object of the present invention to comprise the means on a standard accessory and, more specifically, on the headphones or the pair of ear buds that plug into the MP3. The present object is accomplished by attaching the FM transmitter to a conventional headphone jack.

It is an object of the present invention to design the transmitter to include a means to power the device, a means to tune the device and a means to control the power consumption of the device.

It is an object of the present invention to teach a lightweight and an unobtrusive transmitter. It is a further object of the present invention to teach an FM transmitter that does not hinder the MP3's portable capabilities or the MP3's ability to function in the standard and the typical manner. It is an object of the present invention to provide a means to broadcast the audio stored on the MP3 either to more than one person or in the spaces where wearing a headset is dangerous to the user.

It is an object of the present invention to provide an FM transmitter that transmits at a range of at least 25 feet.

It is a final object of the present invention to provide all of the advantages that the foregoing objects entail. An FM transmitter achieves this object and, more specifically, an FM transmitter comprised in the headphone or the ear bud accessories to a portable, digital audio player.

BRIEF DESCRIPTION OF THE DRAWINGS

The advantages and the features of the present invention will become better understood with reference to the following more detailed description and the claims taken in conjunction with the accompanying drawings, in which like elements are identified with like symbols, and in which:

DESCRIPTION OF THE PREFERRED EMBODIMENTS

Figure 1:
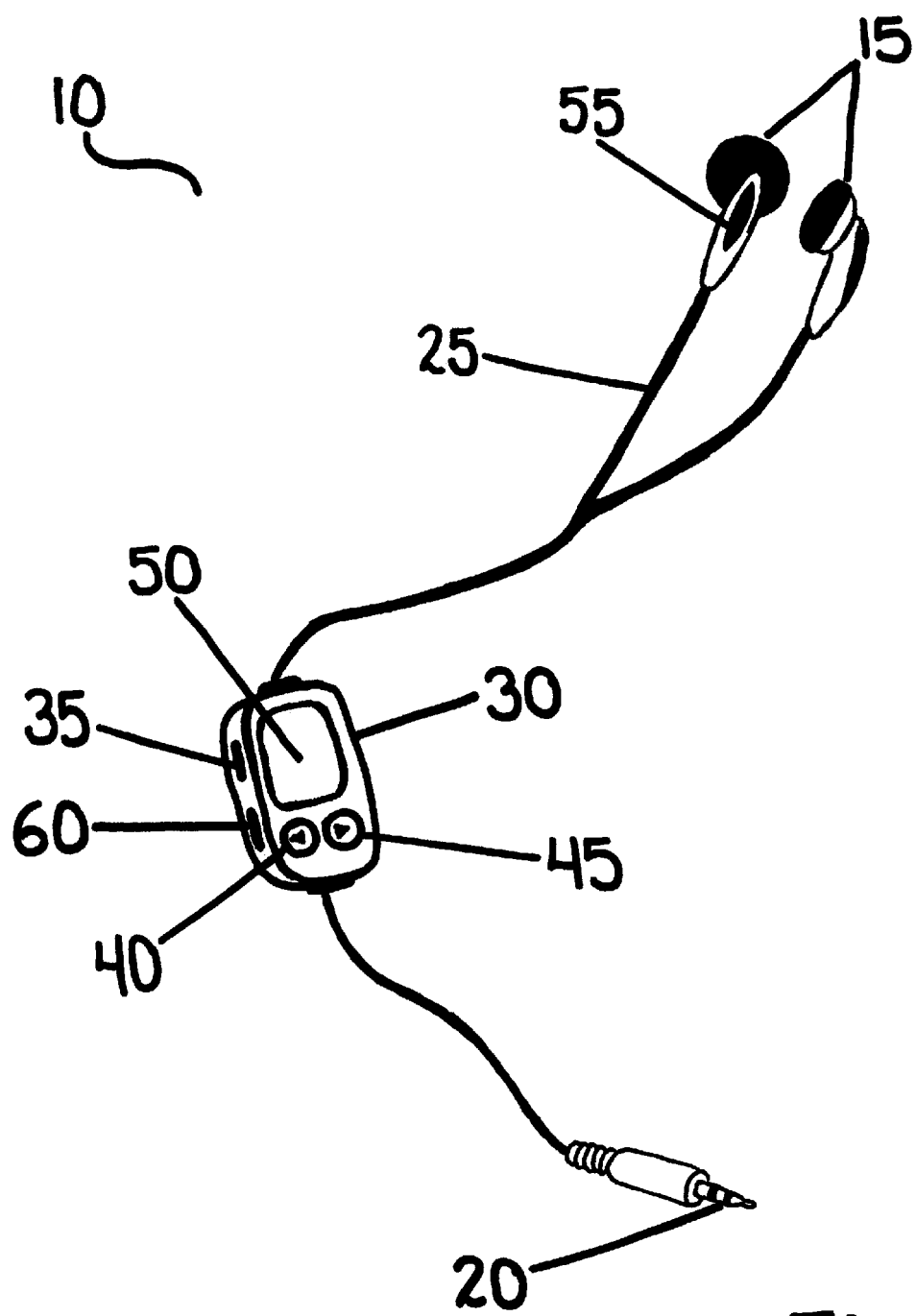
FIG. 1 is an isometric view of a pair of ear buds comprising the FM transmitter according to the preferred embodiment of the present invention.

The best mode for carrying out the invention is presented in terms of its preferred embodiment, herein depicted within the Figures.

1. Detailed Description of the Figures

The FM transmitter 10 according to the preferred embodiment of the present invention is shown in FIG. 1. The FM transmitter 10 is comprised on a headphone accessory; however, the accessory is not limited to the pair of ear buds 15 shown in FIG. 1. Conventional ear buds 15 are shown, but the present invention could be utilized with equal effectiveness over wireless or non wireless headphones. The ear buds 15 comprise a conventional jack plug 20 positioned at the distal end of a cord 25, the jack plug 20 is received by the corresponding jack (not shown) comprised on the MP3 (not shown). The ear buds 15 comprise internal antennae 55 similar to the antennae known in the art. The internal antennae provide a clearer and crisper sound when the FM transmitter 10 is transmitting the audio. In an alternate embodiment to the present invention, a retractable antenna may be comprised on or built into the FM transmitter pack 30.

An FM transmitter pack 30 is attached to the cord 25. The transmitter pack 30 comprises a power button 35 that is utilized as a means to selectively turn the FM transmitter 10 on or off at the times when the user desires to transmit the audio stored on the MP3 to an FM receiver (not shown). The power button 35 turns the transmitter pack 30 off when the user desires to utilize the MP3 in a conventional manner. The means to selectively turn the power on and off is not limited to the power button 35 shown. It is envisioned that a switch and any other means may be utilized to achieve the same purpose. Tuning buttons 40, 45 are also comprised on the transmitter pack 30. The tuning buttons 40, 45 are provided as a means to increase and to decrease the frequency of the FM band to one that is best for the purposes of utilizing the present invention. The means to select a frequency is not limited to the upward and the downward tuner buttons 40, 45 shown in FIG. 1, but may comprise a knob, a pad or any other means that performs the same function.

The transmitter pack 30 further comprises an LCD screen 50 that provides the user with a visual display of his or her selection. It is envisioned that the LCD screen may further display to the user the amount of battery available to power the FM transmitter 10. The FM transmitter 10 may be powered by battery or it may receive its power from the portable audio device. The LCD 50 may further display the songs, the titles and the music transmitted from the MP3.

The transmitter pack 30 may additionally comprise an ear bud power button 60, which provides the user with a means to turn off the ear buds 15 when the audio is transmitted to an FM receiver because the audio will be broadcast through the speakers comprised on the FM receiver. Otherwise, it is envisioned that the power button 35 that turns the transmitter pack 30 on will deactivate the speakers on the ear buds 15.

2. Operation of the Preferred Embodiment

The preferred embodiment of the present invention can be utilized in a simple and an effortless manner. To operate the present invention, the jack plug is plugged into the corresponding jack comprised on the portable audio device. To transmit the audio stored on the MP3 to an FM receiver, the power button is pressed to actuate the transmitter pack. An FM band is selected on the FM receiver that is not one broadcasted from a station. The FM tuning buttons are pressed to change the FM band shown on the visual display to the same frequency selected on the FM receiver. Once the LCD display on the transmitter pack shows that the FM transmitter and the FM receiver are set at the same band, the audio stored on the portable audio device will play on the speakers connected to the FM receiver. The volume, the bass, the treble and the other listener modes may be controlled from the FM receiver. In an alternate embodiment to the present invention, the functions may be controlled from the transmitter pack.

The foregoing descriptions of the specific embodiments of the present invention have been presented for the purposes of illustration and description only. They are not intended to be exhaustive nor are they intended to limit the invention to the precise forms disclosed and, obviously, many modifications and variations are possible in light of the above teaching. The embodiments were chosen and described in order to best explain the principles of the invention and its practical application, to thereby enable others skilled in the art to best utilize the invention and its various embodiments with various modifications as are suited to the particular use contemplated. It is intended that the scope of the invention be defined by the Claims appended hereto and their equivalents. Therefore, the scope of the invention is to be limited only by the following claims.

Having thus described the invention, what is claimed as new and desired and to be secured by Letters Patent is as follows:

1. An FM transmitter comprised on the headphone accessory to a portable digital audio player, said FM transmitter comprises an FM transmitter pack electrically attached to the cord comprised on said headphone accessory, said FM transmitter pack is electrically attached to said cord between the jack plug and the pair of ear buds, wherein said transmitter pack comprises: a means to selectively turn said FM transmitter on or off at the times when the user desires to transmit the audio stored on said portable digital audio player to an FM receiver using said FM transmitter.

2. The FM transmitter of claim 1, wherein said transmitter pack comprises:
  a means to increase and to decrease the frequency of said FM transmitter to the same frequency on said FM receiver; and,
  a means to provide said user with a visual display of said frequency selected.

3. The FM transmitter of claim 2, wherein said means to selectively turn said FM transmitter on or off comprises a power button or a power switch.

4. The FM transmitter of claim 2, wherein said means to increase and to decrease said frequency comprises a pair of tuning buttons, a knob and a pad.

5. The FM transmitter of claim 2, wherein said means to provide a visual display of said frequency is an LCD screen.

6. The FM transmitter of claim 5, wherein said LCD screen further displays the amount of power available to transmitter pack.

7. The FM transmitter of claim 1, wherein said transmitter pack is powered by battery.

8. The FM transmitter of claim 1, wherein said transmitter pack is powered by said portable digital audio player.

* * * * *